(12) United States Patent
Anzawa (10) Patent No.: US 10,767,585 B2
(45) Date of Patent: Sep. 8, 2020

(54) HYBRID VEHICLE

(71) Applicant: TOYOTA JIDOSHA KABUSHIKI KAISHA, Toyota-shi, Aichi-ken (JP)

(72) Inventor: Takumi Anzawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/244,926

(22) Filed: Jan. 10, 2019

(65) Prior Publication Data
US 2019/0218984 A1      Jul. 18, 2019

(30) Foreign Application Priority Data

Jan. 15, 2018 (JP) .................. 2018-004032

(51) Int. Cl.
| | |
|---|---|
| *F01N 3/00* | (2006.01) |
| *F02D 41/02* | (2006.01) |
| *B60W 20/16* | (2016.01) |
| *B60K 6/445* | (2007.10) |
| *F01N 3/023* | (2006.01) |

(Continued)

(52) U.S. Cl.
CPC ............ *F02D 41/029* (2013.01); *B60K 6/445* (2013.01); *B60W 20/16* (2016.01); *F01N 3/023* (2013.01); *F01N 9/002* (2013.01); *B60W 2050/002* (2013.01); *B60W 2510/068* (2013.01); *B60W 2510/0623* (2013.01); *B60W 2510/0628* (2013.01); *B60W 2510/0676* (2013.01); *B60W 2510/244* (2013.01); *B60W 2520/10* (2013.01); *B60W 2540/10* (2013.01); *B60Y 2200/92* (2013.01); *B60Y 2300/476* (2013.01); *F01N 2590/11* (2013.01)

(58) Field of Classification Search
CPC ........ B60K 6/445; B60W 20/16; F01N 3/023; F01N 9/002; F02D 41/029
USPC .......................................................... 60/274
See application file for complete search history.

(56) References Cited

U.S. PATENT DOCUMENTS

| 9,873,336 B2 * | 1/2018 | Hokoi ................... B60W 20/13 |
|---|---|---|
| 2014/0114514 A1 * | 4/2014 | Crombez .............. B60W 20/20 701/22 |

(Continued)

FOREIGN PATENT DOCUMENTS

| JP | 2016-113900 | 6/2016 |
|---|---|---|
| JP | 6149806 | 6/2017 |
| WO | WO2015/049565 A1 | 4/2015 |

*Primary Examiner* — Jason D Shanske
(74) *Attorney, Agent, or Firm* — Finnegan, Henderson, Farabow, Garrett & Dunner, LLP (57) ABSTRACT

A hybrid vehicle includes a vehicle control device to perform a traveling control so as to allow switching between an HV traveling in which the hybrid vehicle travels while an engine works and an EV traveling in which the hybrid vehicle travels while working of the engine is stopped, and an engine control device to execute a filter regeneration control that is an engine control for removing particulate matter deposited in a filter. The engine control device adopts satisfaction of a predetermined first condition, as a requirement for execution of the filter regeneration control, when the number of times of start of the engine after vehicle activation is one, and adopts satisfaction of a second condition, which is satisfied more easily than the first condition, as a requirement for execution of the filter regeneration control, when the number of times of the start is two or more.

5 Claims, 4 Drawing Sheets

(51) Int. Cl.
_F01N 9/00_    (2006.01)
_B60W 50/00_    (2006.01)

(56) References Cited

U.S. PATENT DOCUMENTS

2015/0239460 A1\* 8/2015 Manickaraj ........... B60W 10/08
                                                        701/22
2015/0352962 A1  12/2015 Hokoi
2016/0031430 A1\* 2/2016 Aoki .................... B60W 20/16
                                                        701/22
2016/0149420 A1\* 5/2016 Sasaki ................... B60L 58/14
                                                        320/134

\* cited by examiner

HYBRID VEHICLE

INCORPORATION BY REFERENCE

The disclosure of Japanese Patent Application No. 2018-004032 filed on Jan. 15, 2018 including the specification, drawings and abstract is incorporated herein by reference in its entirety.

BACKGROUND

1. Technical Field

The disclosure relates to a hybrid vehicle equipped with an engine including a filter that collects particulate matter in exhaust gas.

2. Description of Related Art

In some cases, for cleaning exhaust gas from an engine such as an in-vehicle engine, there is provided a particulate filter that collects particulate matter (PM) in the exhaust gas. When the particulate filter continues to collect the PM, the particulate filter is clogged. Therefore, the engine including the particulate filter executes a filter regeneration control that is an engine control for removing the PM deposited in the filter. During execution of the filter regeneration control, the engine is operated in a different state from a normal state, for example, for increasing the temperature of the filter. For example, Japanese Patent Application Publication No. 2016-113900 describes that the filter regeneration control is executed while a cylinder-reduction operation is performed.

SUMMARY

When the engine is operated in the different state from the normal state, combustion of the engine is easily worsened. When the filter regeneration control is executed in a state where the combustion is hard to become stable, the combustion becomes unstable, causing misfire or increase in rotational fluctuation. Particularly, a period immediately after start of the engine is inappropriate for the execution of the filter regeneration control, because the combustion is unstable. Hence, after the start of the engine, the execution of the filter regeneration control can be prohibited until continuous operation is performed over a certain period. However, in this case, in a hybrid vehicle that performs intermittent operation of the engine, the continuous operation of the engine often finishes in a short time, and therefore, there is a possibility that the opportunity of the execution of the filter regeneration control cannot be sufficiently obtained.

The disclosure provides a hybrid vehicle that easily secures the opportunity of the execution of the filter regeneration control.

A hybrid vehicle according to a first aspect of the disclosure includes: an engine mounted on the hybrid vehicle; an electric motor that is a driving source of the hybrid vehicle; a filter that collects particulate matter in exhaust gas from the engine; a vehicle control device configured to control traveling of the hybrid vehicle so as to allow switching between an HV traveling in which the hybrid vehicle travels while the engine works and an EV traveling in which the hybrid vehicle travels while working of the engine is stopped; and an engine control device configured to execute a filter regeneration control that is an engine control for removing the particulate matter deposited in the filter.

The combustion immediately after the start of the engine becomes unstable more easily, as the period of the stop of the engine before the start increases. Meanwhile, in the hybrid vehicle, the working of the engine is stopped for each switching from the HV traveling to the EV traveling, and the engine is started for each switching from the EV traveling to the HV traveling. In this case, in the second or later engine start after vehicle activation, the period of the stop of the engine before the start is often shorter than in the first engine start. That is, when a period in which the engine in the intermittent operation continuously works is referred to as an operation period, in the second or later operation period after the vehicle activation, the combustion of the engine tends to become stable more easily than in the first operation period.

The engine control device in the above aspect adopts satisfaction of a predetermined first condition, as a requirement for the execution of the filter regeneration control, when the number of times of the start of the engine after the vehicle activation is one, and adopts satisfaction of a second condition, which is satisfied more easily than the first condition, as a requirement for execution of the filter regeneration control, when the number of times of the start is two or more. Therefore, in the first operation period after the vehicle activation, which is an operation period in which the combustion is hard to become stable, it is possible to tighten the condition for permitting the execution of the filter regeneration control, and to restrain the combustion from being worsened due to the execution of the filter regeneration control. On the other hand, in the second or later operation period, which is an operation period in which the combustion becomes stable easily, it is possible to loosen the condition for permitting the execution of the filter regeneration control, and to increase the opportunity of the execution of the filter regeneration control. Accordingly, the opportunity of the execution of the filter regeneration control is easily secured.

A hybrid vehicle according to a second aspect of the disclosure includes: an engine mounted on the hybrid vehicle; an electric motor that is a driving source of the hybrid vehicle; a battery that supplies electric power to the electric motor; an electric generator that receives dynamic power of the engine, the electric generator generating electric power with which the battery is charged; a filter that collects particulate matter in exhaust gas from the engine; a vehicle control device configured to select one control mode from a plurality of control modes and to control the hybrid vehicle depending on the selected control mode, the plurality of control modes including a Charge Sustaining mode (CS mode) in which decrease in a state-of-charge of the battery is restrained and a Charge Depleting mode (CD mode) in which the electric power of the battery is consumed; and an engine control device configured to execute a filter regeneration control that is an engine control for removing the particulate matter deposited in the filter.

When the CD mode is selected, since the engine operation for generating electric power is less likely to be required, the period of the stop of the engine during the vehicle activation is likely to be longer than when the CS mode is selected. Therefore, when the CD mode is selected, the combustion of the engine tends to become unstable more easily than when the CS mode is selected.

The engine control device in the above aspect adopts satisfaction of a predetermined first condition, as a requirement for execution of the filter regeneration control, when the CD mode is selected, and adopts satisfaction of a second condition, which is satisfied more easily than the first condition, as a requirement for execution of the filter regeneration control, when the CS mode is selected. Therefore, when the CD mode, in which the combustion is hard to become stable, is selected, it is possible to tighten the condition for permitting the execution of the filter regeneration control, and to restrain the combustion from being worsened due to the execution of the filter regeneration control. On the other hand, when the CS mode, in which the combustion becomes stable easily, is selected, it is possible to loosen the condition for permitting the execution of the filter regeneration control, and to increase the opportunity of the execution of the filter regeneration control. Accordingly, the opportunity of the execution of the filter regeneration control is easily secured.

In the above aspect, the engine control device may be configured to determine whether the first condition is satisfied and whether the second condition is satisfied, based on a predetermined parameter that is obtained from a measurement result of an operating state of the engine, and a value range of the parameter in which the second condition is satisfied may be wider than a value range of the parameter in which the first condition is satisfied.

When the engine control device determines whether the first condition is satisfied and whether the second condition is satisfied, based on a parameter that is increased depending on an elapse of time after a start of the engine, for example, based on an elapsed time, integrated air amount or integrated fuel injection amount after the start, it is possible to avoid the execution of the filter regeneration control from being permitted in a period immediately after the engine start, which is a period in which the combustion is unstable. Further, in the above aspect, the engine control device may be configured to determine whether the first condition is satisfied and whether the second condition is satisfied, based on a parameter that is increased depending on an elapse of time after a start of the engine, and a lower limit of the parameter at which the second condition is satisfied may be lower than a lower limit of the parameter at which the first condition is satisfied. Further, in the above aspect, the first condition may be satisfied when an elapsed time after a start of the engine is equal to or longer than a predetermined first time, and the second condition may be satisfied when the elapsed time is equal to or longer than a second time, the second time being shorter than the first time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
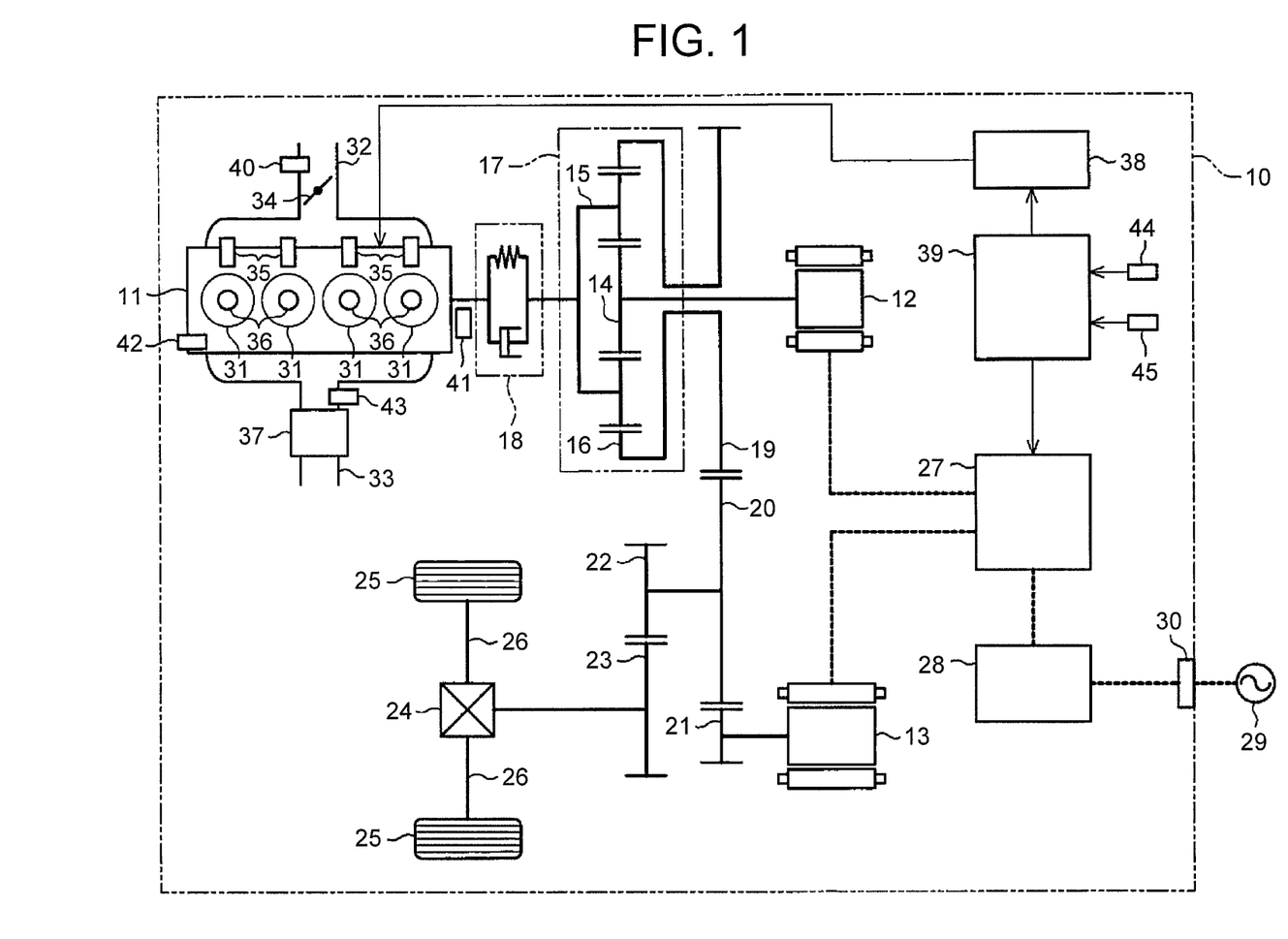
FIG. 1 is a schematic view of a hybrid vehicle according to a first embodiment.

Hereinafter, a first embodiment of a hybrid vehicle will be described in detail with reference to FIG. 1 and FIG. 2. As shown in FIG. 1, an engine 11 is mounted on the hybrid vehicle (hereinafter, merely referred to as a vehicle 10) in the embodiment. The vehicle 10 includes two generator-motors (a first generator-motor 12 and a second generator-motor 13) to function as both of an electric motor that is a driving source of the vehicle 10 and an electric generator that receives dynamic power of the engine 11 and generates electric power.

The vehicle 10 is provided with a planetary gear mechanism 17 including three rotating elements: a sun gear 14, a planetary carrier 15 and a ring gear 16. The planetary carrier 15 of the planetary gear mechanism 17 is linked with the engine 11 through a transaxle damper 18, and the sun gear 14 of the planetary gear mechanism 17 is linked with the first generator-motor 12. The ring gear 16 of the planetary gear mechanism 17 is provided integrally with a counter driving gear 19. The counter driving gear 19 is engaged with a counter driven gear 20. The second generator-motor 13 is linked with a reduction gear 21 engaged with the counter driven gear 20.

The counter driven gear 20 is linked with a final driving gear 22 in an integrally rotatable manner, and the final driving gear 22 is engaged with a final driven gear 23. The final driven gear 23 is linked with driving shafts 26 of wheels 25 through a differential mechanism 24.

The first generator-motor 12 and the second generator-motor 13 are electrically connected to a battery 28 through a power control unit (hereinafter, referred to as a PCU) 27. The PCU 27 adjusts an electric power supply amount from the battery 28 to the first generator-motor 12 and the second generator-motor 13 and a charge amount from the first generator-motor 12 and the second generator-motor 13 to the battery 28. The vehicle 10 is provided with a power source connector 30 that can be connected to an external power source 29, and the battery 28 can be charged also with electric power that is supplied from the external power source 29.

The engine 11 includes a plurality of cylinders 31 in which air-fuel mixture is combusted, an intake passage 32 through which intake gas to flow into the cylinders 31 flows, and an exhaust passage 33 through which exhaust gas generated by the combustion in the cylinders 31 flows. The intake passage 32 is provided with a throttle valve 34 that is a valve for adjusting the flow rate of the intake gas to flow through the intake passage 32. The engine 11, for each cylinder, is provided with a fuel injection valve 35 that injects fuel in the intake gas and an ignition plug 36 that ignites the air-fuel mixture of the fuel and the intake gas by spark discharge. Furthermore, the exhaust passage 33 of the engine 11 is provided with a filter 37 that collects PM in the exhaust gas. An oxidation catalyst to accelerate an oxidation reaction of the collected PM is supported on a surface of a porous material composing the filter 37.

On the vehicle 10, an engine control device 38 is mounted. The engine control device 38 is an electronic control device that controls the engine 11. Further, on the vehicle 10, a vehicle control device 39 is mounted. The vehicle control device 39 integrally controls the engine control device 38 and the PCU 27. Each of the engine control device 38 and the vehicle control device 39 is configured as a computer unit including a read only memory (ROM) in which a program and data for control are stored, a central processing unit (CPU) that executes the program stored in the ROM, and a random access memory (RAM) that is a working area when the CPU executes the program.

The engine control device 38 receives detection signals of an air flow meter 40 that detects an intake air amount GA of the engine 11, a crank angle sensor 41 that detects a rotation angle of the engine 11, a coolant temperature sensor 42 that detects a temperature (engine coolant temperature TW) of coolant of the engine 11, and an exhaust gas temperature sensor 43 that detects a temperature (exhaust gas temperature TE) of the exhaust gas to flow into the filter 37. The engine control device 38 computes a speed (engine speed NE) of the engine 11, based on the detection result of the crank angle sensor 41. Further, the engine control device 38 computes an engine load factor KL, based on the engine speed NE and the intake air amount GA. The engine load factor KL means the rate of a current cylinder inflow air amount to a cylinder inflow air amount at the time of the steady operation of the engine 11, in a state where the throttle valve 34 is fully opened at the current engine speed NE. The cylinder inflow air amount means the amount of the air to flow into each of the cylinders 31 in the intake stroke.

The vehicle control device 39 receives an electric current IB, a voltage VB and a temperature TB of the battery 28. Then, the vehicle control device 39 computes the state-of-charge (SOC) of the battery 28, based on the electric current IB, the voltage VB and the temperature TB. The vehicle control device 39 receives a detection signal of an accelerator pedal sensor 44 that detects a stepping amount (accelerator operation amount ACCP) of an accelerator pedal by a driver, and a detection signal of a speed sensor 45 that detects a traveling speed (vehicle speed V) of the vehicle 10. Then, the vehicle control device 39 computes a required vehicle power that is a required value of driving power of the vehicle 10, based on the accelerator operation amount ACCP and the vehicle speed V. Furthermore, the vehicle control device 39 computes a required engine output that is a required value of engine output, a required MG1 torque that is a required value of powering-regenerative torque of the first generator-motor 12, and a required MG2 torque that is a required value of powering-regenerative torque of the second generator-motor 13, based on the required vehicle power, the state-of-charge SOC, and the like. Then, the engine control device 38 performs an output control for the engine 11 depending on the required engine output, and the PCU 27 performs a torque control for the first generator-motor 12 and the second generator-motor 13 depending on the required MG1 torque and the required MG2 torque, so that a traveling control for the vehicle 10 is performed.

In the traveling control for the vehicle 10, the vehicle control device 39 performs switching between an HV traveling in which the vehicle 10 travels while the engine 11 works and an EV traveling in which the vehicle 10 travels while working of the engine 11 is stopped. The vehicle control device 39 automatically performs the switching between the HV traveling and the EV traveling, based on the accelerator operation amount ACCP, the vehicle speed V, the state-of-charge SOC, and the like. The vehicle control device 39 computes the value of the required engine output, such that the value of the required engine output is "0" at the time of the EV traveling and is a positive value at the time of the HV traveling. The engine control device 38 stops the working of the engine 11 when the value of the required engine output is switched from a positive value to "0", and starts the engine 11 when the value of the required engine output is switched from "0" to a positive value. In this way, the switching between the HV traveling and the EV traveling is performed.

Filter Regeneration Control

As part of the engine control, the engine control device 38 executes a filter regeneration control for removing the PM deposited in the filter 37 by increasing the temperature of the filter 37 to a temperature (regeneration executable temperature) at which the PM burns by itself. In the embodiment, the increase in the temperature of the filter 37 in the filter regeneration control is performed by a dither control. In the dither control, some of the plurality of cylinders 31 are set to rich cylinders in each of which the combustion is performed at a richer air-fuel ratio than a stoichiometric air-fuel ratio, and the other cylinders are set to lean cylinders in each of which the combustion is performed at a leaner air-fuel ratio than the stoichiometric air-fuel ratio. In this way, the fuel injection amount for each cylinder is corrected. Further, the interior of the filter 37 is put into a state where oxygen is excessively contained, by the exhaust gas from each lean cylinder that contains a lot of surplus oxygen. Then, the exhaust gas from each rich cylinder that contains a lot of unburnt fuel is fed to the filter 37, and the fuel is burnt. As a result, the temperature of the filter 37 is increased.

The filter regeneration control is executed in the case where the amount of the PM deposited in the filter 37 is equal to or more than a predetermined value and where a later-described execution permission condition for the filter regeneration control is satisfied. The engine control device 38 estimates and evaluates the amount of the PM deposited in the filter 37, based on the engine speed NE, the engine load factor KL, the exhaust gas temperature TE, and the like.

Figure 2:
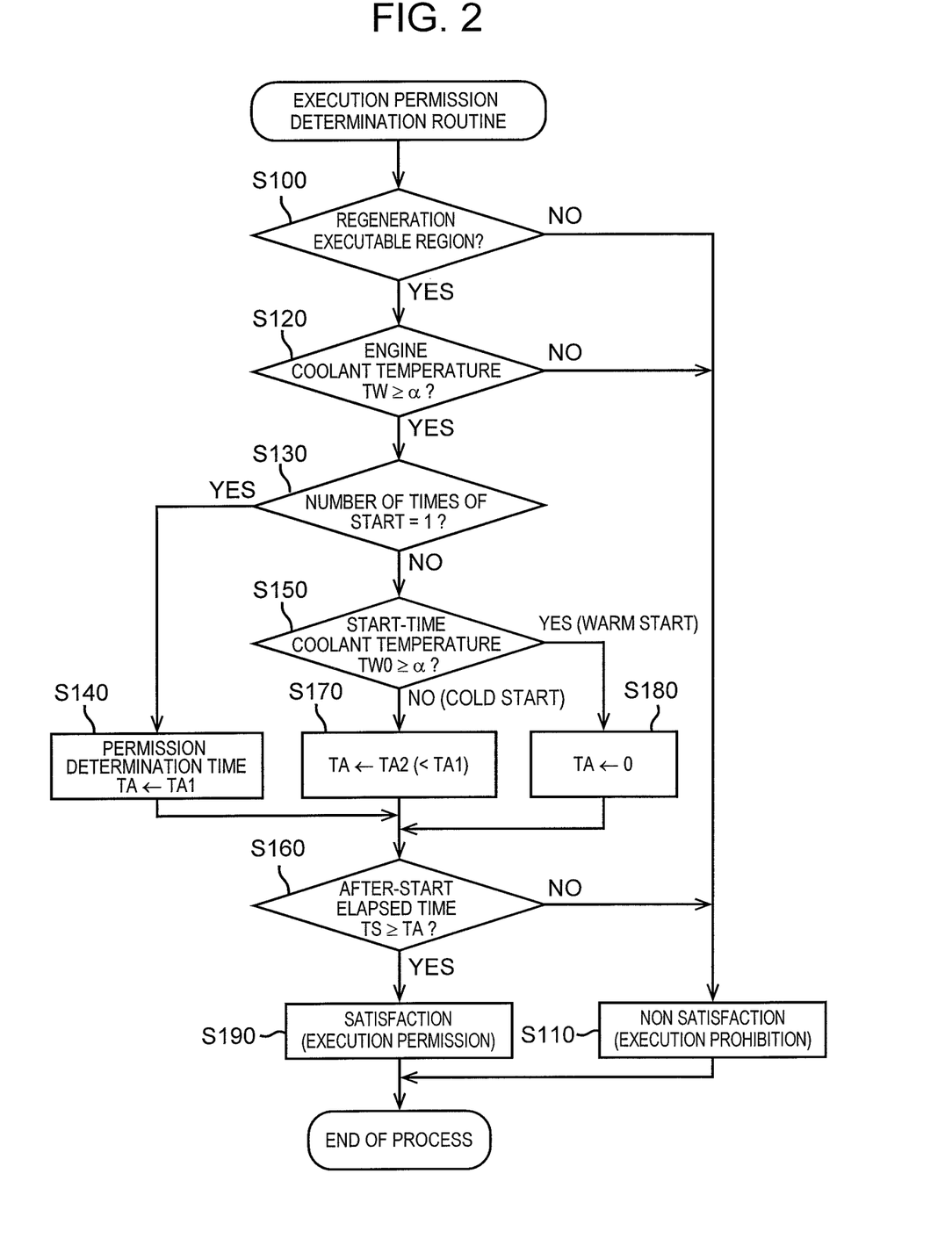
FIG. 2 is a flowchart of an execution permission determination routine that is executed by an engine control device provided in the hybrid vehicle.

FIG. 2 shows a flowchart of an execution permission determination routine for determining whether the execution permission condition for the filter regeneration control is satisfied. The process of the routine, by the engine control device 38, is executed repeatedly in a predetermined cycle, during the working of the engine 11, that is, during the HV traveling of the vehicle 10.

When the process of the routine is started, first, in step S100, it is determined whether the engine 11 is being operated in an operation region (regeneration executable region) in which the filter regeneration control can be executed, based on the engine speed NE and the engine load factor KL. The operation region of the engine 11 outside the regeneration executable region includes an operation region in which the flow rate of the exhaust gas is low and the temperature of the filter 37 cannot be increased to the regeneration executable temperature even when the filter regeneration control is executed, and an operation region in which the exhaust gas temperature TE is high and the filter 37 can be overheated when the filter regeneration control is executed.

When the engine 11 is not being operated in the regeneration executable region (S100: NO), the process proceeds to step S110, and it is determined in step S110 that the execution permission condition is not satisfied. Then, the process of the routine in this cycle ends. On the other hand, when the engine 11 is being operated in the regeneration executable region (S100: YES), the process proceeds to step S120.

When the process proceeds to step S120, it is determined in step S120 whether the engine coolant temperature TW is equal to or higher than a predetermined warming-up completion determination value α. The warming-up completion determination value α is a lower limit of the engine coolant temperature TW at which it is determined that the warming-up of the engine 11 has been completed. When the engine coolant temperature TW is equal to or higher than the warming-up completion determination value α (YES), the process proceeds to step S130, and when the engine coolant temperature TW is lower than the warming-up completion determination value α (NO), the process proceeds to the above-described step S110.

When the process proceeds to step S130, it is determined in step S130 whether the number of times of the start of the engine 11 after vehicle activation is one. When the number of times of the start is one (YES), the process proceeds to step S140, and when the number of times of the start is two or more (NO), the process proceeds to step S150.

When the process proceeds to step S140, a predetermined first time TA1 is set as the value of a permission determination time TA in step S140, and then, the process proceeds to step S160. On the other hand, when the process proceeds to step S150, it is determined in step S150 whether the engine coolant temperature (start-time coolant temperature TW0) at the time of the last engine start is equal to or higher than the warming-up completion determination value α, that is, whether the last engine start is a warm start or a cold start. When the start-time coolant temperature TW0 is lower than the warming-up completion determination value α (S150: NO), a predetermined second time TA2 shorter than the above-described first time TA1 is set as the value of the permission determination time TA in step S170, and then, the process proceeds to step S160. On the other hand, when the start-time coolant temperature TW0 is equal to or higher than the warming-up completion determination value α (S150: YES), "0" is set as the value of the permission determination time TA in step S180, and then, the process proceeds to step S160.

When the process proceeds to step S160, it is determined in step S160 whether an elapsed time TS from the last engine start is equal to or longer than the permission determination time TA. When the elapsed time TS is shorter than the permission determination time TA (NO), the process proceeds to the above-described step S110. On the other hand, when the elapsed time TS is equal to or longer than the permission determination time TA (YES), the process proceeds to step S190. In step S190, it is determined that the execution permission condition is satisfied, and then, the process of the routine in this cycle ends.

Operations and effects of the embodiment will be described. In the embodiment, the execution permission condition for the filter regeneration control is satisfied when all the following conditions (a) to (c) are met. That is, the condition (a) is a condition that the engine 11 is being operated in the region in which the filter regeneration control can be executed, the condition (b) is a condition that the engine coolant temperature TW is equal to or higher than the warming-up completion determination value α, and the condition (c) is a condition that the elapsed time TS after the engine start is equal to or longer than the permission determination time TA.

During the execution of the filter regeneration control, the combustion in each cylinder 31 is performed at a different air-fuel ratio from the stoichiometric air-fuel ratio, by the dither control, and therefore, the combustion becomes unstable easily. Meanwhile, the combustion becomes unstable easily, immediately after the start of the engine 11. When the filter regeneration control is executed in a period immediately after the start, the combustion is worsened, so that fluctuation of the engine speed NE can increase beyond an acceptable range. Hence, in the embodiment, the execution of the filter regeneration control is not permitted, until the above condition (c) is met, that is, until the elapsed time TS becomes equal to or longer than the permission determination time TA.

The combustion immediately after the start of the engine 11 becomes unstable more easily, as the period of the stop of the engine 11 before the start increases. Meanwhile, in the vehicle 10, the working of the engine 11 is stopped for each switching from the HV traveling to the EV traveling, and the engine 11 is started for each switching from the EV traveling to the HV traveling. In this case, in the second or later engine start after the vehicle activation, the period of the stop of the engine 11 before the start is often shorter than in the first engine start. That is, when a period in which the engine 11 in the intermittent operation continuously works is referred to as an operation period, in the second or later operation period after the vehicle activation, the combustion of the engine 11 tends to become stable more easily than in the first operation period.

In the embodiment, the value of the permission determination time TA in the condition (c) differs between the first operation period and second or later operation period after the vehicle activation. Thereby, in the second or later operation period after the vehicle activation, the period immediately after the start in which the execution of the filter regeneration control is not permitted is shorter than in the first operation period. In the second or later operation period after the vehicle activation, when the last engine start is the warm start, it is thought that the period of the stop of the engine 11 before the start is short and an unstable combustion immediately after the start occurs hardly. Therefore, in the second or later operation period after the vehicle activation, when the last engine start is the warm start, the period immediately after the start in which the execution of the filter regeneration control is not permitted is not provided.

In this case, after the second or later engine start after the vehicle activation, since the combustion after the start becomes stable more easily than after the first engine start after the vehicle activation, the execution of the filter regeneration control is permitted in a shorter period. Furthermore, in the case where the second or later engine start after the vehicle activation is the warm start, the execution of the filter regeneration control is permitted immediately if the above condition (a) and condition (b) are met, regardless of the elapsed time TS after the engine start. Therefore, the opportunity of the execution of the filter regeneration control is easily secured, while an unstable combustion due to the execution of the filter regeneration control is restrained.

In the embodiment, the condition that the elapsed time TS after the engine start is equal to or longer than the first time TA1 corresponds to a "predetermined first condition", and the condition that the elapsed time TS is equal to or longer than the second time TA2 that is shorter than the first time TA1 corresponds to a "second condition that is satisfied more easily than the first condition".

The embodiment can be executed while being modified as described below. In the embodiment, the switching between the HV traveling and the EV traveling is automatically performed by the vehicle control device 39, but may be manually performed by driver's operation.

In the embodiment, in the case where the number of times of the start of the engine 11 after the vehicle activation is two or more and where the last engine start is the warm start, "0" is set as the value of the permission determination time TA. In this case, a time that is longer than "0" and that is shorter than the second time TA2 may be set as the value of the permission determination time TA. Further, in the case where the number of times of the start of the engine 11 after the vehicle activation is two or more, the second time TA2 may be set as the value of the permission determination time TA, in the same way, without distinction between the warm start and the cold start.

In the embodiment, in the case where the number of times of the start of the engine 11 after the vehicle activation is one, the first time TA1 is set as the value of the permission determination time TA, in the same way. However, in the case where the last engine start is the warm start, a time shorter than in the case where the last engine start is the cold start, or "0" may be set as the value of the permission determination time TA.

Second Embodiment

Figure 3:
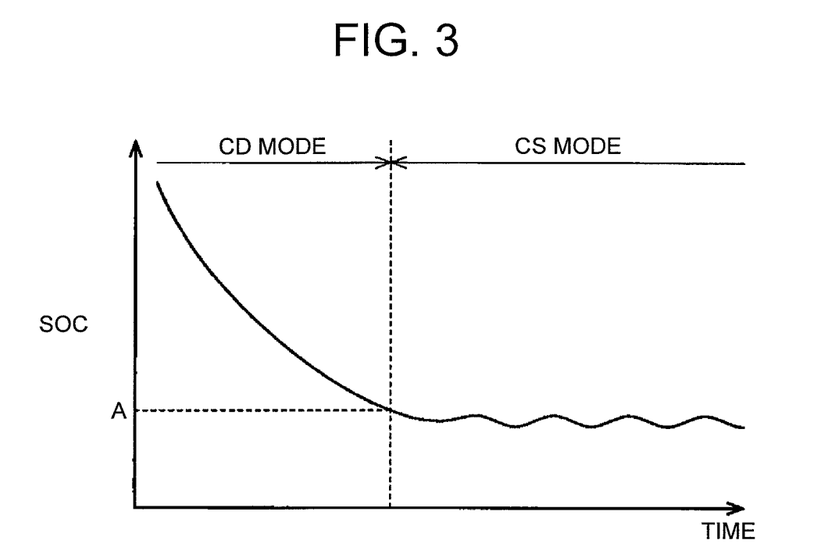
FIG. 3 is a time chart showing a state-of-charge of a battery and a transition of a vehicle control mode in a hybrid vehicle according to a second embodiment.

Next, a second embodiment of the hybrid vehicle will be described in detail with reference to FIG. 3 and FIG. 4. In the embodiment, constituents in common with the above embodiment are denoted by identical reference characters, and detailed descriptions for the constituents are omitted.

A hybrid vehicle in the embodiment has the same hardware configuration as the vehicle 10 in the first embodiment, and there is a difference in the contents of the processes to be executed by the engine control device 38 and the vehicle control device 39, as described below.

First, the vehicle control device 39 in the embodiment selects one control mode from a plurality of control modes including a CS (Charge Sustaining) mode in which decrease in the state-of-charge SOC of the battery 28 is restrained and a CD (Charge Depleting) mode in which the electric power of the battery 28 is consumed, and controls the vehicle 10 depending on the selected control mode. In the embodiment, the vehicle control device 39 automatically performs switching between the CS mode and the CD mode, based on the state-of-charge SOC. Specifically, as shown in FIG. 3, the vehicle control device 39 selects the CD mode when the state-of-charge SOC is higher than a predetermined threshold A, and selects the CS mode when the state-of-charge SOC is equal to or lower than the threshold A.

When the CD mode is selected, the vehicle control device 39 controls the traveling of the vehicle 10, such that preference is given to the EV traveling in which the state-of-charge SOC of the battery 28 is consumed over the sustaining of the state-of-charge SOC of the battery 28. Specifically, when the CD mode is selected, the vehicle control device 39 performs the EV traveling as long as the driving power equivalent to the required vehicle power can be secured only with the output of the second generator-motor 13. Accordingly, when the CD mode is selected, decrease in the state-of-charge SOC is allowed, and the working of the engine 11 for electric power generation is restrained. Therefore, the state-of-charge SOC of the battery 28 decreases with increase in traveling distance.

On the other hand, when the CS mode is selected, the vehicle control device 39 controls the traveling of the vehicle 10, such that preference is given to the sustaining of the state-of-charge SOC over the EV traveling. Specifically, when the CS mode is selected, the vehicle control device 39 executes a charge-discharge control for the battery 28, such that the state-of-charge SOC is sustained in a predetermined control range. That is, when the state-of-charge SOC exceeds the upper limit of the control range, the required engine output is decreased, and by an amount corresponding to the decrease, the output of the second generator-motor 13 is increased, so that the discharge amount of the battery 28 is increased. When the state-of-charge SOC falls below the lower limit of the control range, the required engine output is increased so as to be higher than the required vehicle power, and the excess output is used for the electric power generation by the second generator-motor 13, so that the charge amount of the battery 28 is increased. Accordingly, when the CS mode is selected, the frequency of the working of the engine 11 during the vehicle activation is higher than when the CD mode is selected.

Figure 4:
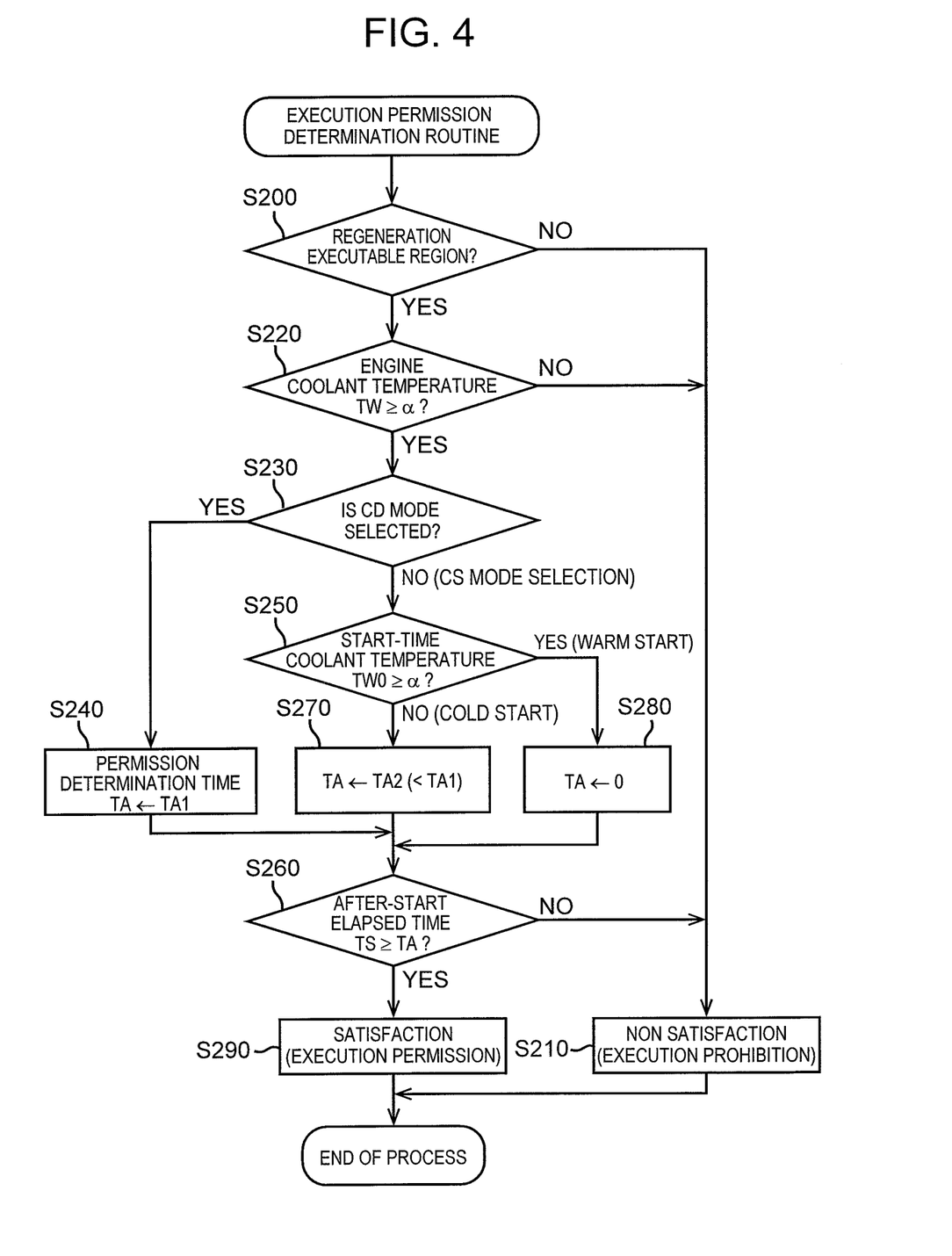
FIG. 4 is a flowchart of an execution permission determination routine that is executed by an engine control device provided in the hybrid vehicle.

Meanwhile, the engine control device 38 in the embodiment determines whether the execution permission condition for the filter regeneration control is satisfied, by processing of an execution permission determination routine shown in FIG. 4. The process of the routine, by the engine control device 38, is executed repeatedly in a predetermined cycle, during the working of the engine 11, that is, during the HV traveling of the vehicle 10.

When the process of the routine is started, first, in step S200, it is determined whether the engine 11 is being operated in the above-described regeneration executable region, based on the engine speed NE and the engine load factor KL. When the engine 11 is not being operated in the regeneration executable region (S200: NO), the process proceeds to step S210, and it is determined in step S210 that the execution permission condition is not satisfied. Then, the process of the routine in this cycle ends. On the other hand, when the engine 11 is being operated in the regeneration executable region (S200: YES), the process proceeds to step S220.

When the process proceeds to step S220, it is determined in step S220 whether the engine coolant temperature TW is equal to or higher than the above-described warming-up completion determination value $\alpha$. When the engine coolant temperature TW is equal to or higher than the warming-up completion determination value $\alpha$ (YES), the process proceeds to step S230, and when the engine coolant temperature TW is lower than the warming-up completion determination value $\alpha$ (NO), the process proceeds to the above-described step S210.

When the process proceeds to step S230, it is determined in step S230 whether the control mode currently selected by the vehicle control device 39 is the CD mode or the CS mode. When the control mode currently selected by the vehicle control device 39 is the CD mode (YES), the process proceeds to step S240, and when the control mode currently selected by the vehicle control device 39 is the CS mode (NO), the process proceeds to step S250.

When the process proceeds to step S240, the above-described first time TA1 is set as the value of the permission determination time TA in step S240, and then, the process proceeds to step S260. On the other hand, when the process proceeds to step S250, it is determined in step S250 whether the engine coolant temperature (start-time coolant temperature TW0) at the time of the last engine start is equal to or higher than the warming-up completion determination value $\alpha$. When the start-time coolant temperature TW0 is lower than the warming-up completion determination value $\alpha$ (S250: NO), the above-described second time TA2 (<TA1) is set as the value of the permission determination time TA in step S270, and then, the process proceeds to step S260. On the other hand, when the start-time coolant temperature TW0 is equal to or higher than the warming-up completion determination value $\alpha$ (S250: YES), "0" is set as the value of the permission determination time TA in step S280, and then, the process proceeds to step S260.

When the process proceeds to step S260, it is determined in step S260 whether the elapsed time TS from the last engine start is equal to or longer than the permission determination time TA. When the elapsed time TS is shorter than the permission determination time TA (NO), the process proceeds to the above-described step S210. On the other hand, when the elapsed time TS is equal to or longer than the permission determination time TA (YES), the process proceeds to step S290. In step S290, it is determined that the execution permission condition is satisfied, and then, the process of the routine in this cycle ends.

Also in the embodiment, the execution permission condition for the filter regeneration control is satisfied in the case of meeting all the three conditions: the condition (a) that the engine 11 is being operated in the region in which the filter regeneration control can be executed, the condition (b) that the engine coolant temperature TW is equal to or higher than the warming-up completion determination value α, and the condition (c) that the elapsed time TS after the engine start is equal to or longer than the permission determination time TA.

At the time of the selection of the CD mode in which the electric power of the battery 28 is consumed, the frequency of the working of the engine 11 is lower than at the time of the selection of the CS mode in which the decrease in the state-of-charge SOC of the battery 28 is restrained. Therefore, when the CD mode is selected, the period of the stop of the engine 11 during the vehicle activation is likely to be longer than when the CS mode is selected, and further, the period in which the combustion immediately after the start of the engine 11 is unstable tends to be longer than when the CS mode is selected. Further, even when the CS mode is selected, after the warm start of the engine 11, the combustion becomes stable more easily than after the cold start.

In response, in the embodiment, when the CS mode is selected, the period immediately after the start in which the execution of the filter regeneration control is not permitted is shorter than when the CD mode is selected. Furthermore, in the case where the CS mode is selected and where the last engine start is the warm start, the period immediately after the start in which the execution of the filter regeneration control is not permitted is set to "0". Thus, in the embodiment, the period immediately after the start in which the execution of the filter regeneration control is not permitted is shorter, in a situation in which the combustion becomes stable more easily. Therefore, the opportunity of the execution of the filter regeneration control is easily secured, while an unstable combustion due to the execution of the filter regeneration control is restrained.

In the embodiment, the condition that the elapsed time TS after the engine start is equal to or longer than the first time TA1 corresponds to a "predetermined first condition", and the condition that the elapsed time TS is equal to or longer than the second time TA2 that is shorter than the first time TA1 corresponds to a "second condition that is satisfied more easily than the first condition".

The embodiment can be executed while being modified as described below. In the embodiment, the switching between the CD mode and the CS mode is performed based on the state-of-charge SOC. However, the switching may be performed based on another parameter such as the vehicle speed V. Further, the switching may be manually performed by driver's operation.

In the embodiment, the CD mode is set as the control mode for performing the EV traveling as long as the driving power equivalent to the required vehicle power can be secured only with the output of the second generator-motor 13. However, the CD mode may be set as a control mode for performing another traveling control, if the control code is a control mode in which the vehicle 10 travels such that the electric power of the battery 28 is consumed, that is, such that the state-of-charge SOC decreases with the increase in the traveling distance. For example, the CD mode may be set as a control mode for performing the EV traveling as long as the decrease amount of the state-of-charge SOC per unit time is equal to or less than a predetermined value.

In the embodiment, the CS mode is set as the control mode for performing the charge-discharge control of the battery 28 such that the state-of-charge SOC is sustained in a predetermined control range. However, the CS mode may be set as another control mode if the control mode is a control mode in which the vehicle 10 travels such that the decrease in the state-of-charge SOC is restrained. For example, the CS mode may be set as a control mode for prohibiting the EV traveling until the state-of-charge SOC becomes equal to or higher than a predetermined value.

In the embodiment, in the case where the CS mode is selected and where the last engine start is the warm start, "0" is set as the value of the permission determination time TA. In this case, a time shorter than the second time TA2 may be set as the value of the permission determination time TA. Further, when the CS mode is selected, the second time TA2 may be set as the value of the permission determination time TA, in the same way, without distinction between the warm start and the cold start.

Even when the CD mode is selected, in the case where the last engine start is the warm start, it is thought that the combustion after the start becomes stable more easily than in the case where the last engine start is the cold start. Therefore, similarly to the time when the CS mode is selected, the value of the permission determination time TA when the CD mode is selected may differ between the case where the last engine start is the warm start and the case where the last engine start is the cold start. That is, when the CD mode is selected, in the case where the last engine start is the warm start, a time shorter than the time (first time TA1) in the case where the last engine start is the cold start, or "0" may be set as the value of the permission determination time TA.

In the embodiment, the value of the permission determination time TA when the CS mode is selected differs between the case of the warm start and the case of the cold start, but in both cases, the same value may be set. Further, the above embodiments and modifications can be executed while being modified as described below.

In the above embodiments, it is determined whether to permit the execution of the filter regeneration control, based on the condition that the elapsed time TS after the engine start is equal to or longer than the predetermined first time TA1, which is the predetermined first condition, and the condition that the elapsed time TS is equal to or longer than the second time TA2 shorter than the first time TA1, which is the second condition that is satisfied more easily than the first condition. Instead of using the elapsed time TS after the engine start, the same determination can be performed also by using a parameter that is increased depending on the elapse of time after the engine start, for example, by using an integrated value of the intake air amount or fuel injection amount after the engine start. In this case, the lower limit of the parameter at which the second condition is satisfied is set to a value lower than the lower limit of the parameter at which the first condition is satisfied.

The object to easily secure the opportunity of the execution of the filter regeneration control while restraining an unstable combustion due to the execution of the filter regeneration control can be achieved when the requirement for the execution of the filter regeneration control is set as follows. Here, the case where the number of times of the start of the engine after the vehicle activation is one or the case where the CS mode is selected is referred to as a first situation, and the case where the number of times of the start is two or more or the case where the CD mode is selected is referred to as a second situation. In the case where the requirement for the execution of the filter regeneration control in the first situation is the satisfaction of the predetermined first condition, the above object can be achieved when the requirement in the second situation is the satisfaction of the second condition that is satisfied more easily than the first condition. The above object can be achieved, for example, when the filter regeneration control executable region in the condition (a) of the execution permission condition for the filter regeneration control is set to a wider region in the second situation than in the first situation, or when the warming-up completion determination value α in the condition (b) of the execution permission condition is set to a smaller value in the second situation than in the first situation. That is, in the first situation, the requirement for the execution of the filter regeneration control is the satisfaction of the first condition, and in the second situation, the requirement for the execution of the filter regeneration control is the satisfaction of the second condition. On this occasion, whether the first condition is satisfied and whether the second condition is satisfied are determined based on a predetermined parameter that is obtained from the measurement result of the operating state of the engine 11, and the value range of the parameter in which the second condition is satisfied is set to a wider range than the value range in which the first condition is satisfied.

In the above embodiments, the filter regeneration control is executed by increasing the temperature of the filter 37 by the dither control. However, the filter regeneration control may be executed by increasing the temperature of the filter 37 by another method. For example, the filter regeneration control may be executed by performing a control to retard the ignition timing or performing a rich spike intermittently. In any case, during the execution of the filter regeneration control, the engine 11 is operated in a different state from a normal state, and the combustion becomes unstable easily.

The vehicle 10 in the above embodiments is configured as a plug-in-type hybrid vehicle in which the battery 28 can be charged by the external power source 29. However, the vehicle 10 may be configured as a hybrid vehicle other than the plug-in type. Further, the vehicle 10 may be configured as a series hybrid vehicle in which the engine is not used as a driving source for traveling and is used only for electric power generation.

What is claimed is:

1. A hybrid vehicle comprising:
an engine mounted on the hybrid vehicle;
an electric motor that is a driving source of the hybrid vehicle;
a filter that collects particulate matter in exhaust gas from the engine;
a vehicle control device configured to control traveling of the hybrid vehicle so as to allow switching between an HV traveling in which the hybrid vehicle travels while the engine works and an EV traveling in which the hybrid vehicle travels while working of the engine is stopped; and
an engine control device configured to execute a filter regeneration control that is an engine control for removing the particulate matter deposited in the filter, wherein
the engine control device is configured to adopt satisfaction of a predetermined first condition, as a requirement for execution of the filter regeneration control, when the number of times of start of the engine after vehicle activation is one, and to adopt satisfaction of a second condition, as a requirement for execution of the filter regeneration control, when the number of times of the start is two or more, the second condition being satisfied more easily than the first condition.

2. The hybrid vehicle according to claim 1, wherein:
the engine control device is configured to determine whether the first condition is satisfied and whether the second condition is satisfied, based on a predetermined parameter that is obtained from a measurement result of an operating state of the engine; and
a value range of the parameter in which the second condition is satisfied is wider than a value range of the parameter in which the first condition is satisfied.

3. The hybrid vehicle according to claim 1, wherein:
the engine control device is configured to determine whether the first condition is satisfied and whether the second condition is satisfied, based on a parameter that is increased depending on an elapse of time after the start of the engine; and
a lower limit of the parameter at which the second condition is satisfied is lower than a lower limit of the parameter at which the first condition is satisfied.

4. The hybrid vehicle according to claim 1, wherein:
the first condition is satisfied when an elapsed time after the start of the engine is equal to or longer than a predetermined first time; and
the second condition is satisfied when the elapsed time is equal to or longer than a second time, the second time being shorter than the first time.

5. A hybrid vehicle comprising:
an engine mounted on the hybrid vehicle;
an electric motor that is a driving source of the hybrid vehicle;
a battery that supplies electric power to the electric motor;
an electric generator that receives dynamic power of the engine, the electric generator generating electric power with which the battery is charged;
a filter that collects particulate matter in exhaust gas from the engine;
a vehicle control device configured to select one control mode from a plurality of control modes and to control the hybrid vehicle depending on the selected control mode, the plurality of control modes including a Charge Sustaining mode in which decrease in a state-of-charge of the battery is restrained and a Charge Depleting mode in which the electric power of the battery is consumed; and
an engine control device configured to execute a filter regeneration control that is an engine control for removing the particulate matter deposited in the filter, wherein
the engine control device is configured to:
adopt satisfaction of a predetermined first condition, as a requirement for execution of the filter regeneration control, when the Charge Depleting mode is selected, and to adopt satisfaction of a second condition, as a requirement for execution of the filter regeneration control, when the Charge Sustaining mode is selected, the second condition being satisfied more easily than the first condition, and
determine whether the first condition is satisfied and whether the second condition is satisfied, based on a predetermined parameter that is obtained from a measurement result of an operating state of the engine, wherein a value range of the parameter in which the second condition is satisfied is wider than a value range of the parameter in which the first condition is satisfied.

* * * * *